United States Patent [19]
Hsu

[11] Patent Number: 5,814,212
[45] Date of Patent: *Sep. 29, 1998

[54] MONITORING PROCESS AND DEVICE FOR AN ACTIVATED CARBON FILTRATION SYSTEM OF DRINKING WATER

[76] Inventor: Chao Fou Hsu, 109, Lane 316, Dah Shuenn 3th Rd., Kaohsiung, Taiwan

[*] Notice: The term of this patent shall not extend beyond the expiration date of Pat. No. 5,499,197.

[21] Appl. No.: 613,845

[22] Filed: Mar. 11, 1996

[51] Int. Cl.⁶ .................................................. B01D 17/12
[52] U.S. Cl. .............................. 210/87; 210/93; 210/100; 210/138
[58] Field of Search ................................. 210/85, 87, 90, 210/93, 96.1, 96.2, 100, 103, 108, 138, 143, 257.2, 258, 259, 321.69, 416.3, 636, 632, 739, 741, 746, 806, 195.2; 364/479.01, 479.1, 479.14, 496, 497, 499–502, 509, 510, 550; 340/603, 606, 609

[56] References Cited

U.S. PATENT DOCUMENTS

| | | | |
|---|---|---|---|
| 3,856,676 | 12/1974 | Grimme et al. | 210/96.2 |
| 4,801,375 | 1/1989 | Padilla | 210/100 |
| 4,885,081 | 12/1989 | Oliver | 210/87 |
| 4,918,426 | 4/1990 | Butts et al. | 210/89 |
| 4,969,991 | 11/1990 | Valadez | 210/195.2 |
| 5,089,144 | 2/1992 | Ozkahyaogu et al. | 210/87 |
| 5,096,574 | 3/1992 | Birdsong et al. | 210/90 |
| 5,450,358 | 9/1995 | Seibert et al. | 364/497 |
| 5,494,573 | 2/1996 | Schoenmeyr et al. | 210/258 |
| 5,499,197 | 3/1996 | Fou | 210/143 |
| 5,527,451 | 6/1996 | Hembree et al. | 210/100 |
| 5,676,824 | 10/1997 | Jeon et al. | 210/87 |

*Primary Examiner*—Joseph W. Drodge
*Attorney, Agent, or Firm*—David & Raymond; Raymond Y Chan

[57] ABSTRACT

A monitoring device for a activated carbon filtration system of drinking water includes a microprocessor that controls the overall operations of the monitoring system, a LCD indicating circuit that relates information to maintenance personnel, a detecting component that analyses related data for determining the condition and extents of clogging of an activated carbon filter, a warning component that produces verbal or musical sound for warning consumers about the clogged condition of the water activated carbon filter, and a power switching component that cuts off the water supply of the system If the activated carbon filter is clogged, the monitoring device will make a sound to warn of such condition of the activated carbon filter and will eventually cut off the power supply to the pump for stopping water delivery if the clogged activated carbon filter is not replaced after a certain period of time.

2 Claims, 4 Drawing Sheets

MONITORING PROCESS AND DEVICE FOR AN ACTIVATED CARBON FILTRATION SYSTEM OF DRINKING WATER

BACKGROUND OF THE PRESENT INVENTION

The present invention relates generally to an activated carbon filtration system of drinking water, and more particularly to a monitoring process and device for an activated carbon filtration system of drinking water, which can monitor the drinking water machine to make purified and de-toxic drinking water having the quality of purity in conformity with the standard of public health. The present invention is used for notifying the maintenance personnel of the time to replace the purifying element of the filtration system or ceasing the water supply in response to expired purifying element service life.

The main culprits of the water pollution today include industrial waste, household waste, farm pesticide, and the animal waste produced by hog and poultry farms. As the pollution problems of the source of our drinking water, such as the river, become increasingly worrisome, people lose their confidence in the quality of their drinking water provided by the water company. Furthermore, people's anxiety about the quality of their drinking water is further aggravated by the fact that the conditions of the water supplying pipes and reservoirs are often found to be unsatisfactory. Accordingly, a variety of water-treating devices, such as water-filtering devices, water purifying devices, water softening devices, etc., have become ubiquitous in offices, homes, factories, schools, churches, and so forth. The conventional activated carbon filtration system of drinking water is effective in improving the quality of the drinking water. Nevertheless, the conventional activated carbon filtration system of drinking water is defective in design. The shortcomings inherent in the conventional drinking machines are described explicitly hereinafter.

Referring to FIG. 2A, a traditional activated carbon filtration system is illustrated, which comprises an activated carbon filter 4 for removing the poison contents in water, such as the pesticide pollution of water source near agricultural areas.

However, such activated carbon filter 4 has a service life, i.e. the activated carbon filter will become ineffective after filtering a certain total volume of water, such as 1500 gallons. The service life is usually indicated by the manufacturer in its operation menu. Therefore, the activated carbon filter 4 would gradually become ineffective after a certain period of serving time. Finally, the ineffective activated carbon filter 4 may form an excellent environment for bacteria, fungi and germs.

Sometimes, the activated carbon filter is incorporated with other purifying elements, such as an impurity filter device and/or a reverse osmosis filtration element in order to enhance the purifying quality of water. As shown in FIG. 1, the most common filtration system of drinking water is illustrated, which comprises a water pressure pump 1, an impurity filter device 2, a reverse osmosis filtration element 3, and an activated carbon filter 4. The activated carbon filter 4 is installed before or after the reverse osmosis filtration element 3 for removing the poison contents in water.

Since the most harmful contents in water which may hurt the human health are poison contents such as toxic chemicals, one of the main objects of a water purification system is to provide drinking water absolutely without poison contents. Thus, the activated carbon filter plays a very important role in the filtration system.

Accordingly, the activated carbon filter of the filtration system is normally replaced after a predetermined period of time of use without knowing the actual condition of the activated carbon. In many cases, overused activated carbon filter fails to be replaced in time and consumers are unknowingly led to drink the poor quality water produced by such ineffective water purification system. It happens from time to time that the cleaning schedule of the activated carbon filter is unintentionally disregarded or overlooked. Furthermore, the chore of replacing the activated carbon filter is not the task that people enjoy to do. It is an irresistible trend of the modern age that the consumers prefer an automated appliance rather than a manually operated appliance.

The activated carbon filtration system for drinking water as mentioned above is capable of removing the toxic contents in water. If such poison contents are allowed to accumulate in the activated carbon filter, its filtering effect will be seriously undetermined to an extent that bacteria and fungi will grow and flourish on the worn-out activated carbon. Thereby, a potential health hazard is brought about to the users of the activated carbon filtration system.

Moreover, if the activated carbon filtration system of drinking water is used less often, the service life of the activated carbon is prolonged accordingly. Therefore, the scheduled maintenance work of the activated carbon filtration system is likely to be delayed or even skipped. The operating performance of the activated carbon filtration system is often compromised by the lack of the routine maintenance work.

In fact, no matter what kind of the activated carbon filtration system of drinking water you have installed, none of the activated carbon filtration system is provided with a warning system which serves to notify the user of the system that the activated carbon filtration system is no longer working properly to ensure providing only of drinking water that is absolutely safe to drink.

SUMMARY OF THE PRESENT INVENTION

The primary object of the present invention to provide a monitoring process of an activated carbon filtration system of drinking water for monitoring the effectiveness of the activated carbon filtration system, warning of its undesirable condition, stopping the supply of drinking water from the activated carbon filtration system to protect the unaware consumers when an undesirable condition persists.

It is still another object of the present invention to provide a monitoring device of an activated carbon filtration system of drinking water, capable of automatically monitoring the quantity of the drinking water made by the activated carbon filtration system, advancing information signals when the output water quantity is under a predetermined standard so as to warn the users of the timing of the need for replacing the activated carbon filter, and to cause ceasing the supply of water from the activated carbon filtration system when the output drinking water is under the predetermined standard condition so as to ensure providing only of drinking water having the highest quality.

DETAILED DESCRIPTION OF THE PREFERRED EMBODIMENT

The present invention provides a monitoring process and device for an activated carbon filtration system of drinking water, which comprises a predetermined number of purifying element.

Figure 2A:
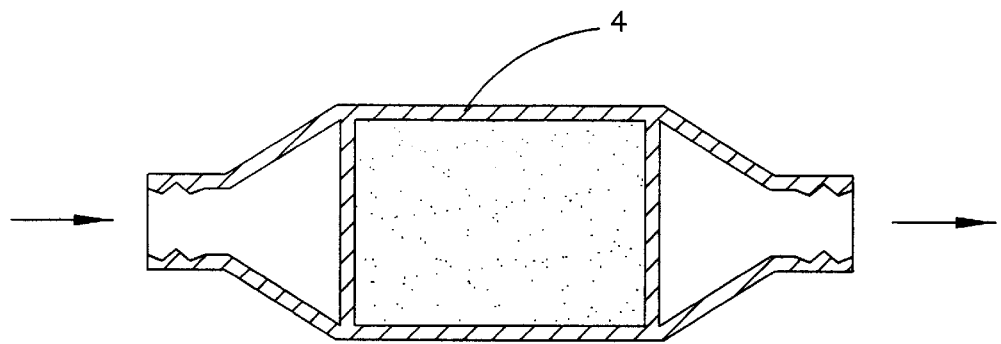
FIG. 2A is a schematic diagram illustrating water flow directions in a conventional activated carbon filter.
Figure 2B:
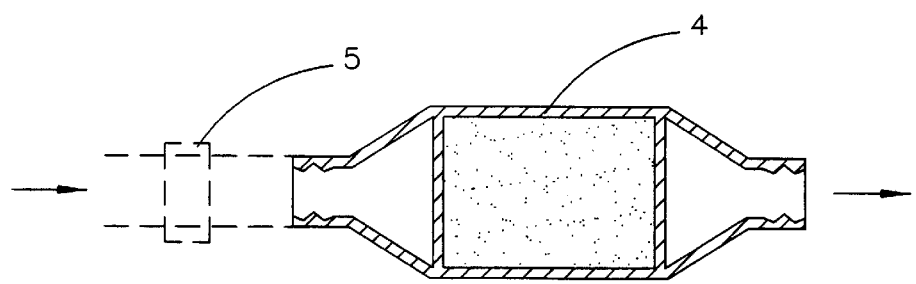
FIG. 2B is a schematic diagram illustrating water flow through an activated carbon filter having an electromagnetic gate installed according to the present invention.

As shown in FIG. 2B, an activated carbon filter 4 filters water by passing therethrough, which absorbs and removes toxic chemicals in water. The number of such activated carbon filters required depends on the amount of chemical toxins in the water supply.

Figure 3:
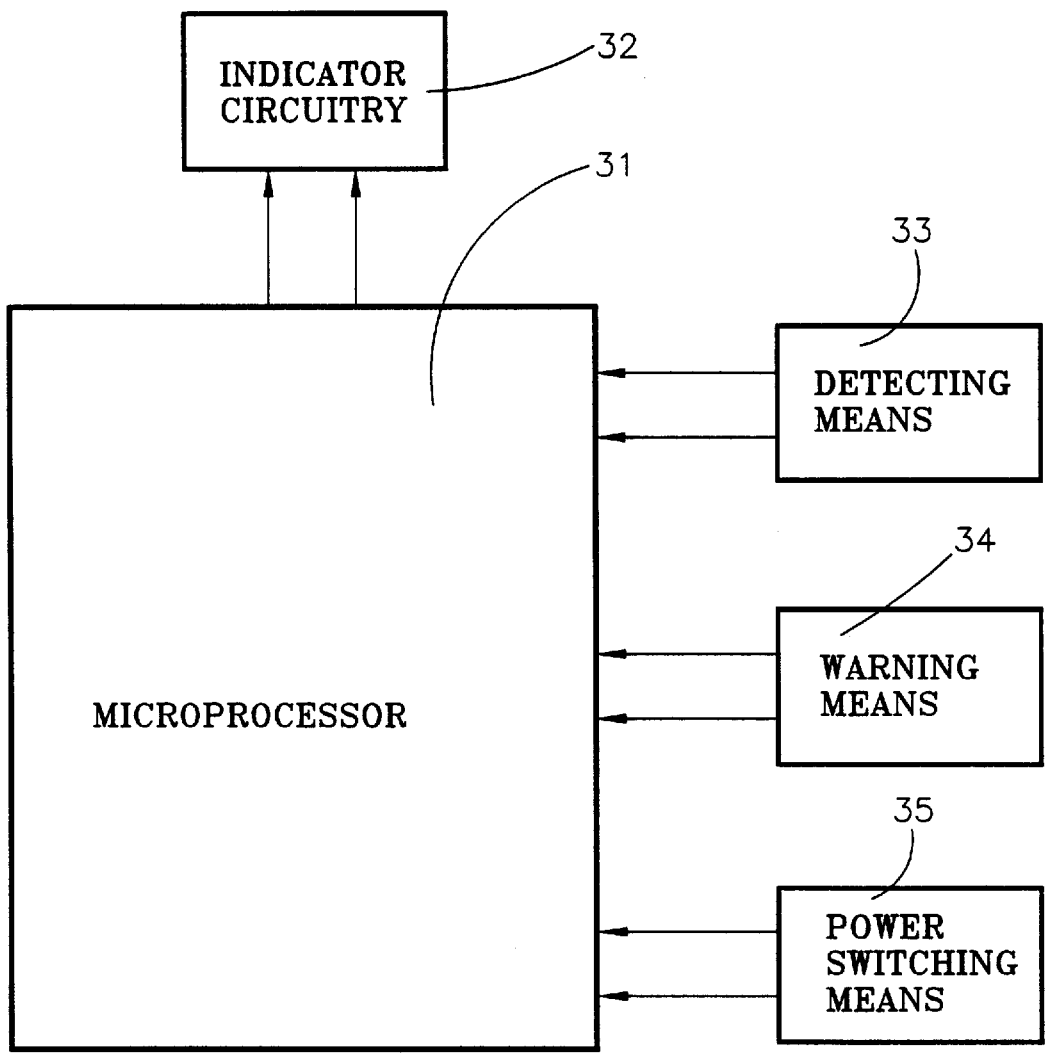
FIG. 3 is a flow chart of a monitoring device for an activated carbon filtration system of drinking water of the present invention.
Figure 4:
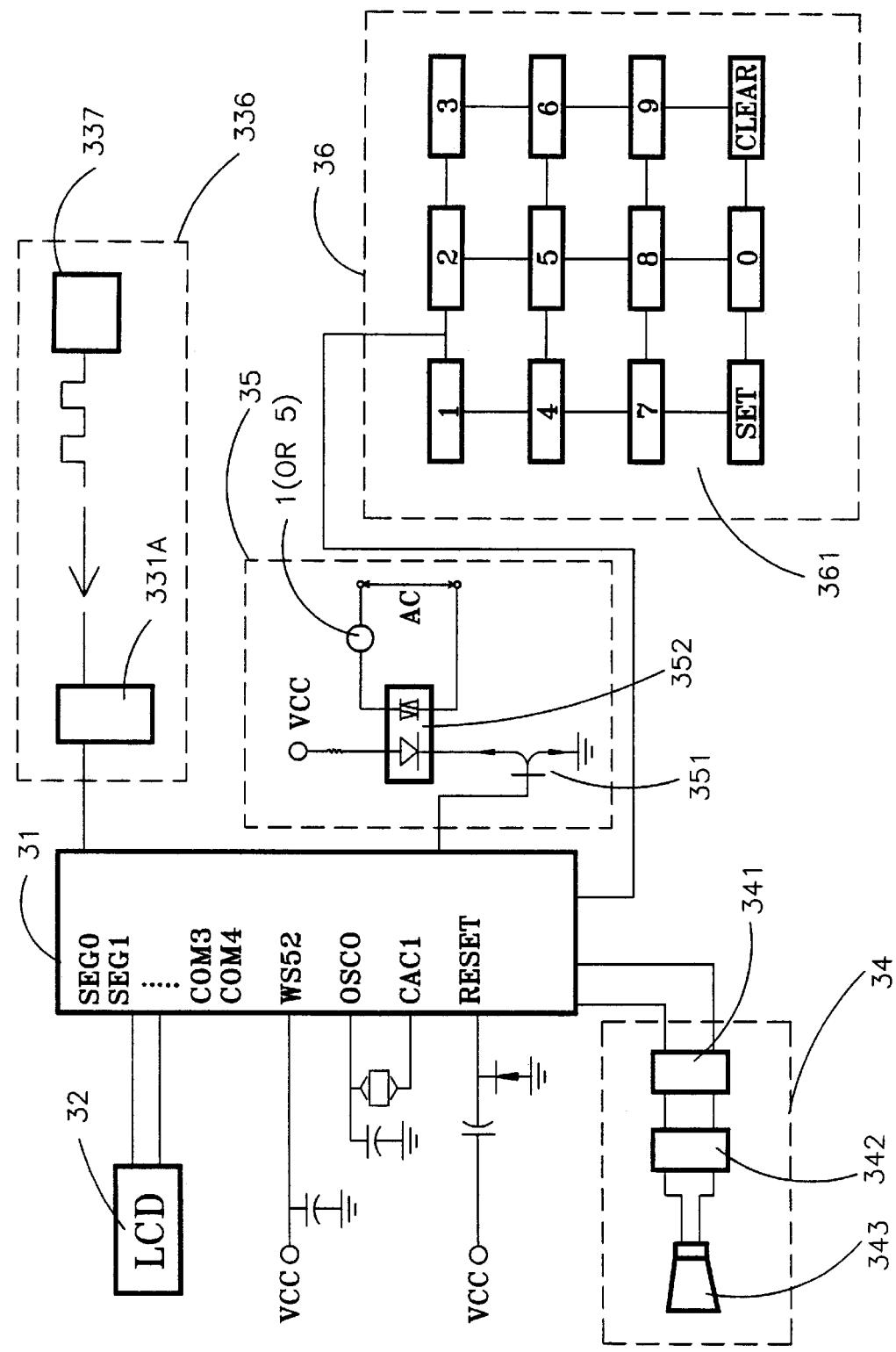
FIG. 4 is a circuit diagram of the monitoring device for an activated carbon filtration system having at least an activated carbon filter according to the present invention.

Referring to FIG. 3, which is a block diagram of the monitoring device of the present invention the monitoring device of the present invention comprises a microprocessor 31, a LCD indictor circuitry 32 electrically connected to the microprocessor 31, a detecting means 33 electrically connected to the microprocessor 31, a warning means 34 electrically connected to the microprocessor 31, an electromagnetic gate 5 which is installed to a water passage connecting to the activated carbon filter 4 (as shown in FIG. 2B), a power switching means 35 electrically connected to the microprocessor 31, and an information input circuitry 36 (as shown in FIG. 4).

Operational signals from the detecting means 33, regarding a functional condition of each activated carbon filter made by detecting the quantity of the drinking water made, are sent to the microprocessor 31. When the microprocessor 31 receives such signals from the detecting means 33, the microprocessor 31 will process respective responses by respectively sending, corresponding signals to the warning means 34 and the power switching means 35 for activating them to process predetermined functions.

The microprocessor 31 controls the operation of the monitoring device and shares a power source with the activated carbon filtration system. A total water making volume value that is a total water volume of drinking water which can be made by the activated carbon filter of the activated carbon filtration system is formatted and input into the microprocessor 31 as a predetermined reference value. A preferred embodiment of the present invention uses a monolithic chip microprocessor 31 such as model number 8051 or 8052. The 1/0 memory of the microprocessor 31 is constituted by a monolithic chip. The programs stored in the microprocessor 31 control the entire operation of the monitoring device.

The LCD indicator circuitry 32 is electrically connected to the microprocessor 31 for notifying the users of the timing for replacing the disabling activated carbon filter 4 of the activated carbon filtration system and indicating a plurality of operational condition data which are sent from the microprocessor 31, including a current time, a recorded time of when was the previous replacement of the activated carbon filter, the current water making volume value that shows the current volume of drinking water produced by the activated carbon filter 4, the total water making volume value that is the total volume of drinking water which can be produced by the activated carbon filter 4 before the activated carbon filter 4 becomes ineffective, and a mechanical breakdown condition that illustrates whether the activated carbon filtration system is normally functioning or mechanically out of order, etc. All the operational condition data are stored in the microprocessor 31.

As shown in FIGS. 3 and 4, the detecting means 33 comprises an activated carbon filter detecting circuitry 33$g$ electrically connected to the microprocessor 31 for monitoring the functional condition of the activated carbon filter by detecting the quantity of the drinking water made by the activated carbon filter by means of a water flowmeter which is used to determine the functional condition of the activated carbon filter. A detected signal sent from the water flowmeter is read and operated by the activated carbon filter detecting circuitry 33$g$ which generates a related condition detecting value. When the condition detecting value reaches the predetermined reference value preset in the microprocessor, the detecting means will send a digital signal to the microprocessor.

The warning means 34 is electrically connected to the microprocessor 31 for advancing a warning information signal to notifying of the timing for the users to replace the activated carbon filter 4. The warning means 34 is activated by the microprocessor 31 of the monitoring device by the sending of an activating signal thereto when a condition detecting value is detected approximating to the predetermined reference value, so as to indicate that the service life of the activated carbon filter 4 is expired.

The power switching means 35 is electrically connected to the microprocessor 31 and activated by the microprocessor 31 for ceasing supply of drinking water form the activated carbon filtration system when the warning means 34 is activated to generate the warning information signal for a predetermined period of time. It means that the specific activated carbon filter has become ineffective and the drinking water so made is not safe for human consumption.

When the specific worn-out activated carbon filter is replaced by a new one, the activated carbon filtration system is manually restarted to produce drinking water again, the warning means 33 is manually operated to stop the warning information sound signal and the monitoring device is reactivated.

In accordance with the monitoring device of the activated carbon filtration system of drinking water as disclosed above, as shown in FIG. 4, the warning means 34 comprises a sound generating circuitry having a configuration that produces verbal or musical sound for warning consumers about a disabled condition of the activated carbon filter. Of course, the sound generating circuitry 34 can be substituted with a usual lighting generating circuitry. Moreover, the warning means 34 can comprise both a sound generating circuitry and a lighting generating circuitry so as to generate both warning sound and warning lighting.

The sound generating circuitry 34 comprises a sound circuit IC 341, a speaker driving circuit 342 and a speaker 343 electrically connected, in which the sound circuit IC 341 stores a verbal or music sound track. The speaker driving circuit 342 broadcasts the stored verbal sound or music of the sound circuit IC 341 via the speaker 343.

In accordance with the monitoring device of the activated carbon filtration system of the present invention, as shown in FIG. 4, the activated carbon filter detecting circuitry 33$g$ comprises a calculator 331$a$ and a water flowmeter 337 which is installed in a water outlet of the activated carbon filter 4. The water flowmeter 337 will generate a series of corresponding pulse waves which are transmitted to the calculator 331a when the drinking water produced from the activated carbon filter is flowing therethrough, for computing the amount of drinking water flowing out from the activated carbon filter 4. The calculator 331a receives and accumulates such pulse waves to achieve the current water making volume value as a condition detecting value that displays the current volume of drinking water made by the activated carbon filter 4. When the condition detecting value exceeds the predetermined reference value which represents the service life of the activated carbon filter 4, that is the total volume of drinking water that can be made by the activated carbon filter 4 until it becomes ineffective, a digital signal will be sent from the carbon filter detecting circuitry 33g to the microprocessor 31 to activate the microprocessor 31 to send out an activating signal to the sound generating circuitry 34 which will generate a warning verbal or music sound to notify the user to replace the activated carbon filter in order to ensure the drinking water quality.

When the activated carbon filtration system of drinking water only comprises the activated carbon filter 4 (i.e. without the reverse osmosis filtration filter 3 or pressure pump 1), an electromagnetic gate 5 is installed in a duct connecting with the outlet or inlet of the activated carbon filter 4. The electromagnetic gate 5 is electrically connected with the power switching means 35, as shown in FIG. 2B.

Figure 1:
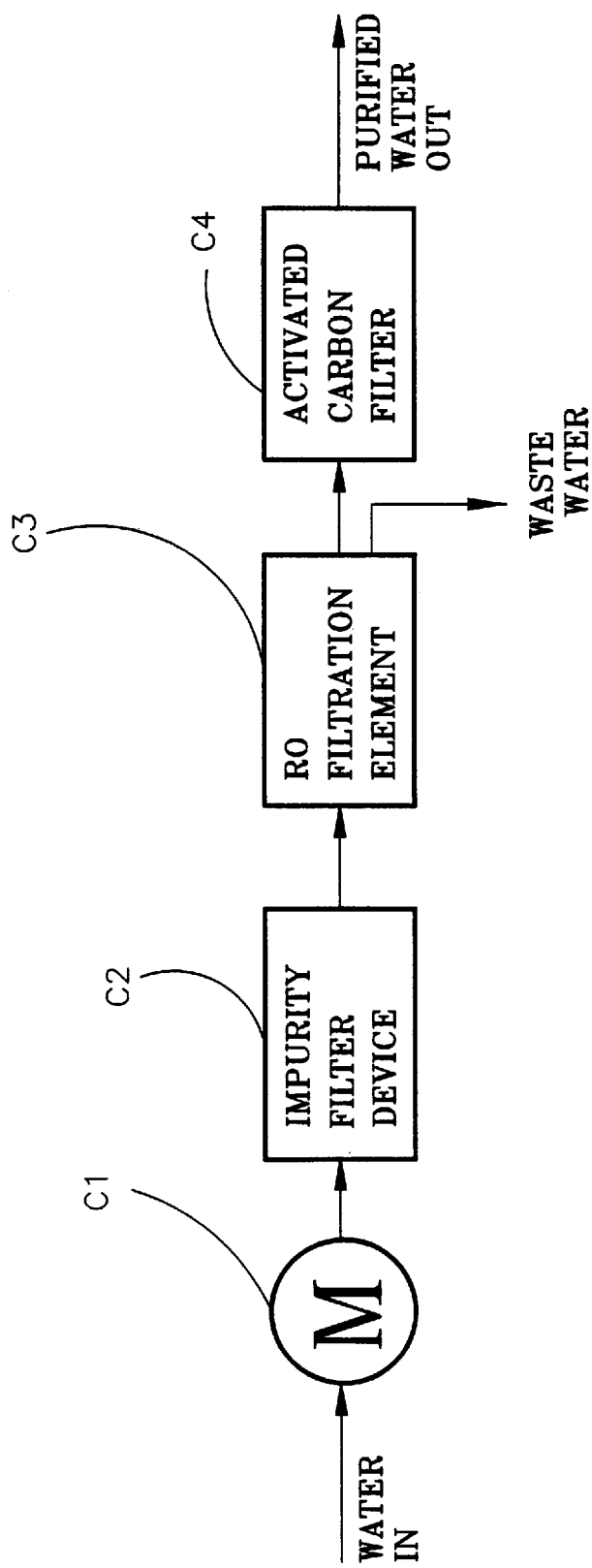
FIG. 1 is a block diagram of an activated carbon filtration system of drinking water incorporating an impurity filter device and a reverse osmosis filtration element according to the present invention.

As shown in FIG. 4, the power switching means 35 comprises a transistor 351 and a photoelectric driving power transistor 352 which are electrically connected. The programmed microprocessor 31 will send an activated signal to the power switching means 35 when the warning means 34 is activated to generate a warning sound for a certain predetermined period of time. When the transistor 351 is activated to conduct electricity by the activated signal sent from the microprocessor 31, the photoelectric driving power transistor 352 activates the electromagnetic gate 23 to shut off the water flow through the activated carbon filter 4. If the activated carbon filtration system further incorporates a reverse osmosis filtration element and a water pressure pump C1, as shown in FIG. 1, the photoelectric driving power transistor 352 will cut off the electrical power of the water pressure pump C1.

As shown in FIGS. 3 and 4, since the service lives of various activated carbon filters may be varied due to their different sizes, the monitoring device of the present invention can further comprise an information input circuitry 36 which is electrically connected to the microprocessor 31. Through the information input circuitry 36, the users can format and store the specific service life of a specific activated carbon filter into the microprocessor 31 as the standard reference value.

As shown in FIG. 4, the information input circuitry 36 comprises an input keyboard 361 which has a plurality of numeral keys from 0 to 9, a "SET" key and a "CLEAR" key. If the "CLEAR" key is pressed, the previous standard reference value regarding the service life of the activated carbon filter 4 is detected. Then, a new service life data can be keyed in by means of the numeral keys to set up a new standard reference value. Finally, such new standard reference value can be saved by pressing the "SET" key.

The monitoring process of an activated carbon filtration system of drinking water is further described hereinafter.

The monitoring process of an activated carbon filtration system of drinking water having at least an activated carbon filter comprises the steps of:

(1) inputting and formatting specific service life data of the activated carbon filter into a microprocessor as a corresponding predetermined reference value, (2) monitoring a functional condition of the activated carbon filter by detecting the quality of the drinking water produced by the activated carbon filter by means of a water flowmeter, wherein the flowmeter generates a series of corresponding pulse waves to a calculator, which is electrically connected to the microprocessor, for accumulating the amount of drinking water flowing out from the activated carbon filter;

(3) generating a condition detecting value regarding the functional condition of the activated carbon filter by the calculator by receiving and accumulating the pulse waves to achieve a total water volume value that is the total volume of the drinking water made by the activated carbon filter; comparing the condition detecting value with the respective predetermined reference value regarding the service life of the activated carbon filter.

(4) sending a digital signal, which is readable by the microprocessor, to the microprocessor when the condition detecting value of the activated carbon filter approximates the respective predetermined reference value, indicating that the service life of the activated carbon filter will soon be expired;

(5) sending an activating signal to a warning means which is electrically connected with the microprocessor and advancing a warning information signal to remind the user of the timing to replace the activated carbon filter;

(6) ceasing supply of drinking water from the activated carbon filtration system by a power switching means, which is electrically connected with the microprocessor and activated by the microprocessor, when the warning means is activated to generate the warning information signal for a certain predetermined period of time; and (7) manually stopping the warning information signal of the warning means and restarting the activated carbon filtration system to produce drinking water again when the specified worn-out activated carbon filter is replaced by a new one.

Furthermore, after the formatting step (3), the monitoring process further comprises an indicating step of notifying the user of the timing to replace the activated carbon filter and indicating a plurality of operational condition data which are sent from the microprocessor, including the current time, the recorded time of when the previous replacement of the activated carbon filter was, the current value of water making volume which shows the current total volume of drinking water produced by the activated carbon filter, the total value of water making volume which shows the total volume of drinking waters which can be produced by the activated carbon filtration system, and the mechanical breakdown condition that illustrates whether the activated carbon filtration system is normally functioning or mechanically out of order, wherein all the operational condition data are stored in the microprocessor.

Furthermore, in the ceasing step (6), the ceasing of the drinking water supply can be operated by cutting off the electrical power be a water pressure pump of the activated carbon filtration system in order to stop the water pumping to the activated carbon filter.

Moreover, in the ceasing step (6), the ceasing of the drinking water supply can also be operated by shutting off an electromagnetic gate installed in a water outlet or inlet of the activated carbon filter.

I claim:

1. An activated carbon filtration system for filtering drinking water having at least an activated carbon filter, and including a monitoring device comprising:

a microprocessor operable for storing at least a total water making volume value of said activated carbon filter as a predetermined reference value, that is a total volume of drinking water that said activated carbon filter is manufactured to produce before said activated carbon filter becomes ineffective;

a LCD indicator circuitry which is electrically connected to said microprocessor and operable for notifying an user of a timing to replace said activated carbon filter and indicating a plurality of operational condition data sent from said microprocessor, said operational condition data including a current time, a recorded time showing when a previous replacement of said activated carbon filter was made, a current water making volume value that shows a current total volume of drinking water produced by said activated carbon filter, said total water making volume value, and a mechanical breakdown condition that illustrates whether said activated carbon filtration system is mechanically out of order;

a warning means, which is electrically connected to said microprocessor, for advancing a warning information signal to notify said user of said timing to replace said activated carbon filter, said warning means comprising a sound generating circuitry which comprises a sound circuit, a speaker driving circuit and a speaker all electrically connected, said sound circuit storing a sound track, said speaker driving circuit broadcasting said stored sound track as said warning information signal via said speaker;

a detecting means comprising at least an activated carbon filter detecting circuitry which is electrically connected to said microprocessor for monitoring a functional condition of said activated carbon filter by detecting the quantity of drinking water produced by said activated carbon filter by means of a water flowmeter, wherein said water flowmeter is installed in a water outlet of said activated carbon filter for determining said functional condition of said activated carbon filter by transmitting a series of pulse waves to a calculator to compute an amount of said drinking water flowing out from said activated carbon filter, wherein said calculator receives and accumulates said pulse waves to achieve said current water making volume value that is a current volume of drinking water made by said activated carbon filter as a condition detecting value, wherein when said condition detecting value exceeds said predetermined reference value, a digital signal is sent from said activated carbon filter detecting circuitry to said microprocessor to activate said microprocessor to send out an activating signal to said sound generating circuitry to generate said sound information signal to notify said user to replace said activated carbon filter;

an electromagnetic gate installed to a water passage connecting to said activated carbon filter;

a power switching means which is electrically connected to said microprocessor comprising a transistor and a photoelectric driving power transistor all electrically connected, wherein when said warning means is activated to generate said warning information signal for a predetermined period of time, an activated signal is sent from said microprocessor to said power switching means to activate said transistor to conduct electricity, so that said photoelectric driving power transistor activates said electromagnetic gate to shut off said water passage connecting to said activated carbon filter for ceasing a water supply of said activated carbon filtration system; and an information input circuitry which is electrically connected to said microprocessor for keying in said total water making volume value of said activated carbon filter into said microprocessor, said information input circuitry comprising an input keyboard which has a plurality of numeral keys from 0 to 9, a "SET" key and a "CLEAR" key, wherein said total water making volume value of said activated carbon filter is keyed in by pressing said numeral keys, saved by pressing said "SET" key and deleted by pressing said "CLEAR" key.

2. An activated carbon filtration system for filtering drinking water having at least an activated carbon filter for filtering water pumped therethrough by means of an electrical water pressure pump, and including a monitoring device comprising:

a microprocessor operable for storing at least a total water making volume value of said activated carbon filter as a predetermined reference value, that is a total volume of drinking water that said activated carbon filter is manufactured to produce before said activated carbon filter becomes ineffective;

a LCD indicator circuitry which is electrically connected to said microprocessor and operable for notifying an user of a timing to replace said activated carbon filter and indicating a plurality of operational condition data sent from said microprocessor, said operational condition data including a current time, a recorded time showing when a previous replacement of said activated carbon filter was made, a current water making volume value that shows a current total volume of drinking water produced by said activated carbon filter, said total water making volume value, and a mechanical breakdown condition that illustrates whether said activated carbon filtration system is mechanically out of order;

a warning means, which is electrically connected to said microprocessor, for advancing a warning information signal to notify said user of said timing to replace said activated carbon filter, said warning means comprising a sound generating circuitry which comprises a sound circuit, a speaker driving circuit and a speaker all electrically connected, said sound circuit storing a sound track, said speaker driving circuit broadcasting said stored sound track as said warning information signal via said speaker;

a detecting means comprising at least an activated carbon filter detecting circuitry which is electrically connected to said microprocessor for monitoring a functional condition of said activated carbon filter by detecting the quantity of drinking water produced by said activated carbon filter by means of a water flowmeter, wherein said water flowmeter is installed in a water outlet of said activated carbon filter for determining said functional condition of said activated carbon filter by transmitting a series of pulse waves to a calculator to compute an amount of said drinking water flowing out from said activated carbon filter, wherein said calculator receives and accumulates said pulse waves to achieve said current water making volume value that is a current volume of drinking water made by said activated carbon filter as a condition detecting value, wherein when said condition detecting value exceeds said predetermined reference value, a digital signal is sent from said activated carbon filter detecting circuitry to said microprocessor to activate said microprocessor to send out an activating signal to said sound generating circuitry to generate said sound information signal to notify said user to replace said activated carbon filter;

a power switching means which is electrically connected to said microprocessor comprising a transistor and a photoelectric driving power transistor all electrically connected, wherein when said warning means is activated to generate said warning information signal for a predetermined period of time, an activated signal is sent said microprocessor to said power switching means to activate said transistor to conduct electricity, so that said photoelectric driving power transistor is activated to cut off a power supply of said water pressure pump for ceasing a water supply of said activated carbon filtration system; and an information input circuitry which is electrically connected to said microprocessor for keying in said total water making volume value of said activated carbon filter into said microprocessor, said information input circuitry comprising an input keyboard which has a plurality of numeral keys from 0 to 9, a "SET" key and a "CLEAR" key, wherein said total water making volume value of said activated carbon filter is keyed in by pressing said numeral keys and, saved by pressing said "SET" key and deleted by pressing said "CLEAR" key.

* * * * *